H. O. JACKSON.
ROTARY AIR COMPRESSOR.
APPLICATION FILED JAN. 19, 1918.
1,352,750.
Patented Sept. 14, 1920.
4 SHEETS—SHEET 2.
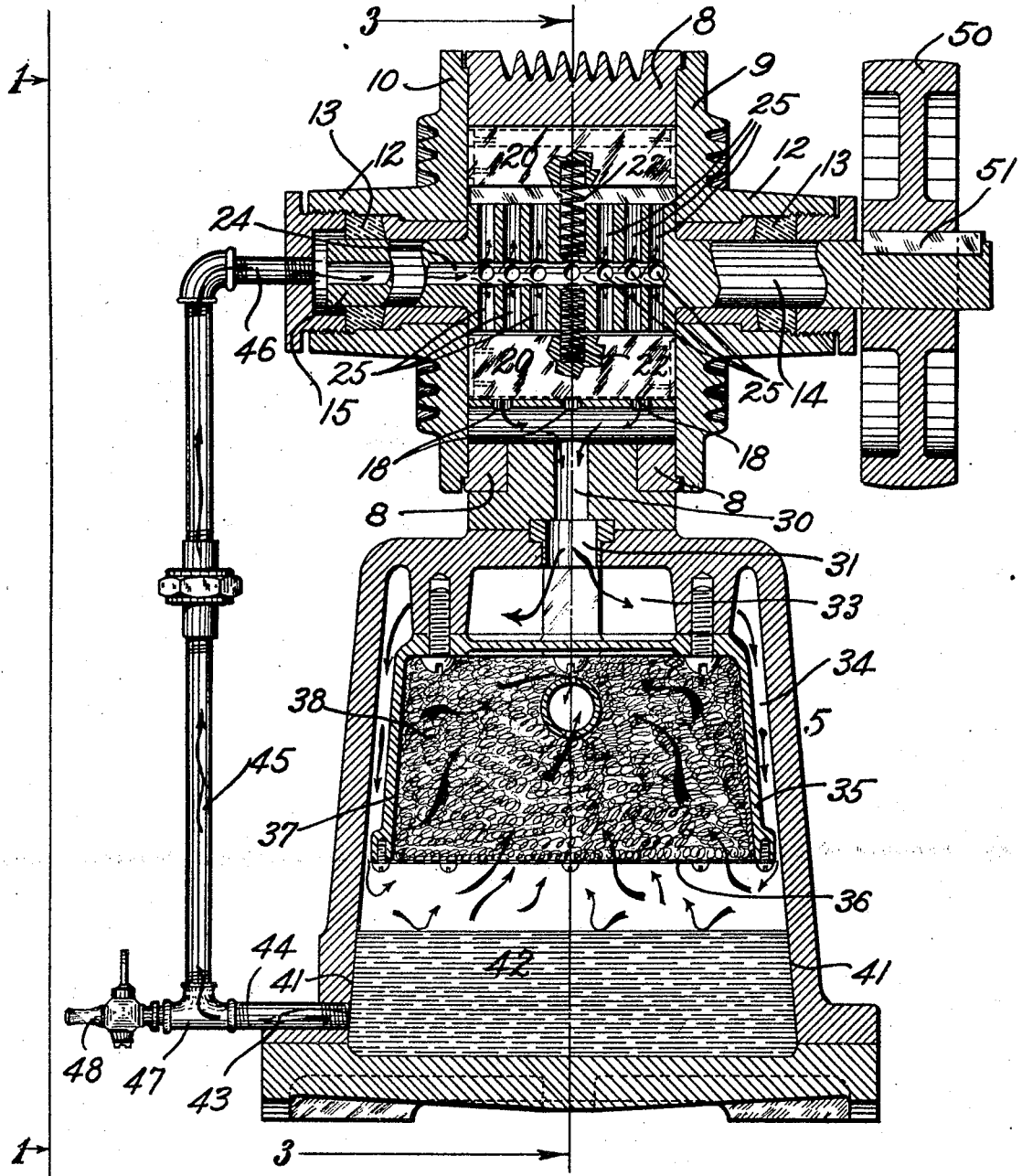
Fig. 2.
Inventor
H. O. Jackson.

H. O. JACKSON.
ROTARY AIR COMPRESSOR.
APPLICATION FILED JAN. 19, 1918.

1,352,750.

Patented Sept. 14, 1920.
4 SHEETS—SHEET 3.

Inventor
H. O. Jackson.
By A. J. O'Brien
Attorney

H. O. JACKSON.
ROTARY AIR COMPRESSOR.
APPLICATION FILED JAN. 19, 1918.
1,352,750.
Patented Sept. 14, 1920.
4 SHEETS—SHEET 4.
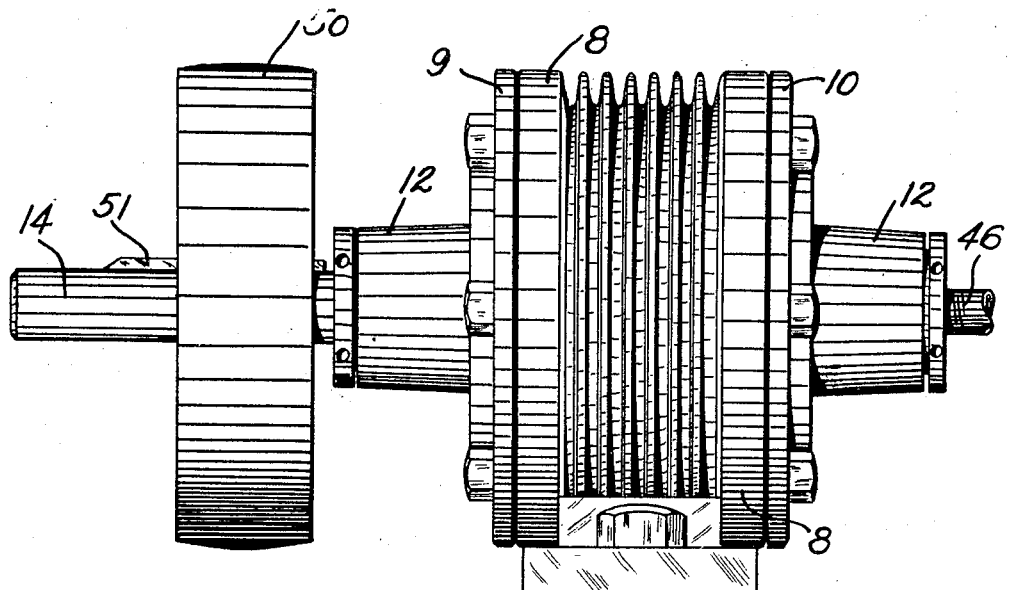
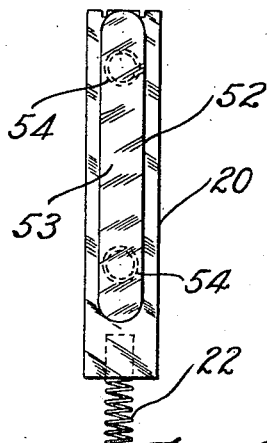
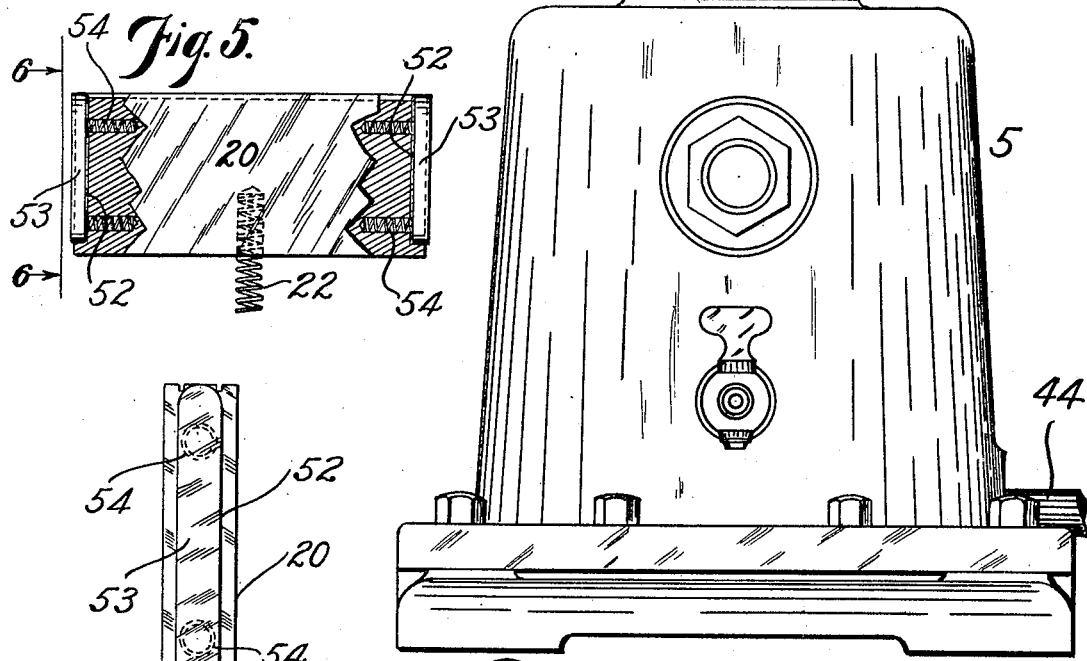
Inventor
H. O. JACKSON.
By
Attorney

UNITED STATES PATENT OFFICE.

HENRY O. JACKSON, OF DENVER, COLORADO, ASSIGNOR TO THE JACKSON COMPRESSOR COMPANY, OF DENVER, COLORADO, A CORPORATION OF COLORADO.

ROTARY AIR-COMPRESSOR.

1,352,750.   Specification of Letters Patent.   Patented Sept. 14, 1920.

Application filed January 19, 1918. Serial No. 212,539.

*To all whom it may concern:*

Be it known that I, HENRY O. JACKSON, a citizen of the United States, residing at 1130 12th street, in the city and county of Denver and State of Colorado, have invented certain new and useful Improvements in Rotary Air-Compressors, and do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in rotary air compressors, my object being to provide an apparatus of this class which shall be of simple and economical construction, reliable, durable and efficient in use.

In my improvement I employ a cylindrical rotor mounted in a chamber and so positioned that the rotor is eccentric to the bore or wall of the chamber. An important feature in my improvement consists in the fact that the chamber is struck from a plurality of centers, one of which is the center of the rotor. Hence the surface of the inner wall of the chamber coincides in shape in cross section with a plurality of arcs, one of which, as illustrated in the drawing, is a ninety degree arc struck from the center of the rotor. Hence the rotor is approximately in contact with the wall of this chamber for a distance of ninety degrees and this distance is the distance between the air intake and the discharge or outlet for the compressed air. This proximity of contact between the rotor and the inner wall of the chamber coöperates with the liquid, as oil, which circulates through the machine, as hereinafter explained, to form a seal between the rotor and the chamber in which it is located, between the inlet and outlet of said chamber. When in rotary motors or engines, the rotor is mounted tangentially to the inner wall of the chamber, it is difficult to maintain a seal and prevent leakage between the rotor and the wall of the chamber. In my improvement this difficulty is overcome in the manner heretofore explained.

In my present construction, the rotor is slotted from its exterior surface inwardly to receive a number of blades or piston members which are mounted to reciprocate in said slots and when the machine is in use, are held outwardly against the inner wall of the chamber both by centrifugal force and by oil pressure which enters the slots from the center of the rotor and is under the some pressure as the air which passes into the receiver, plus the centrifugal force developed by the action of the rotor when the machine is in operation, the construction being such that there is a constant circulation of oil through the rotor, through the compressed air outlet, thence into a chamber where the oil and air are separated, from which the air passes to the receiver and the oil returns to the center of the rotor. In this manner the contiguous parts are kept well lubricated and sealed and the heat is reduced to a minimum.

Having briefly outlined my improvement, I will proceed to describe the same in detail, reference being made to the accompanying drawing in which is illustrated an embodiment thereof. In this drawing:

Fig. 2 is a vertical section taken on the line 2—2, Fig. 1, looking toward the left.

Fig. 4 is a side elevation of my improved air compressor viewed in the direction of arrow 4, Fig. 1.

Fig. 5 is a detailed view partially in section illustrating one of the reciprocably mounted blades of the rotor.

Fig. 6 is an end elevation of the same, or a view looking in the direction of arrows 6, Fig. 5.

The same reference characters indicate the same parts in all the views.

Figure 1:
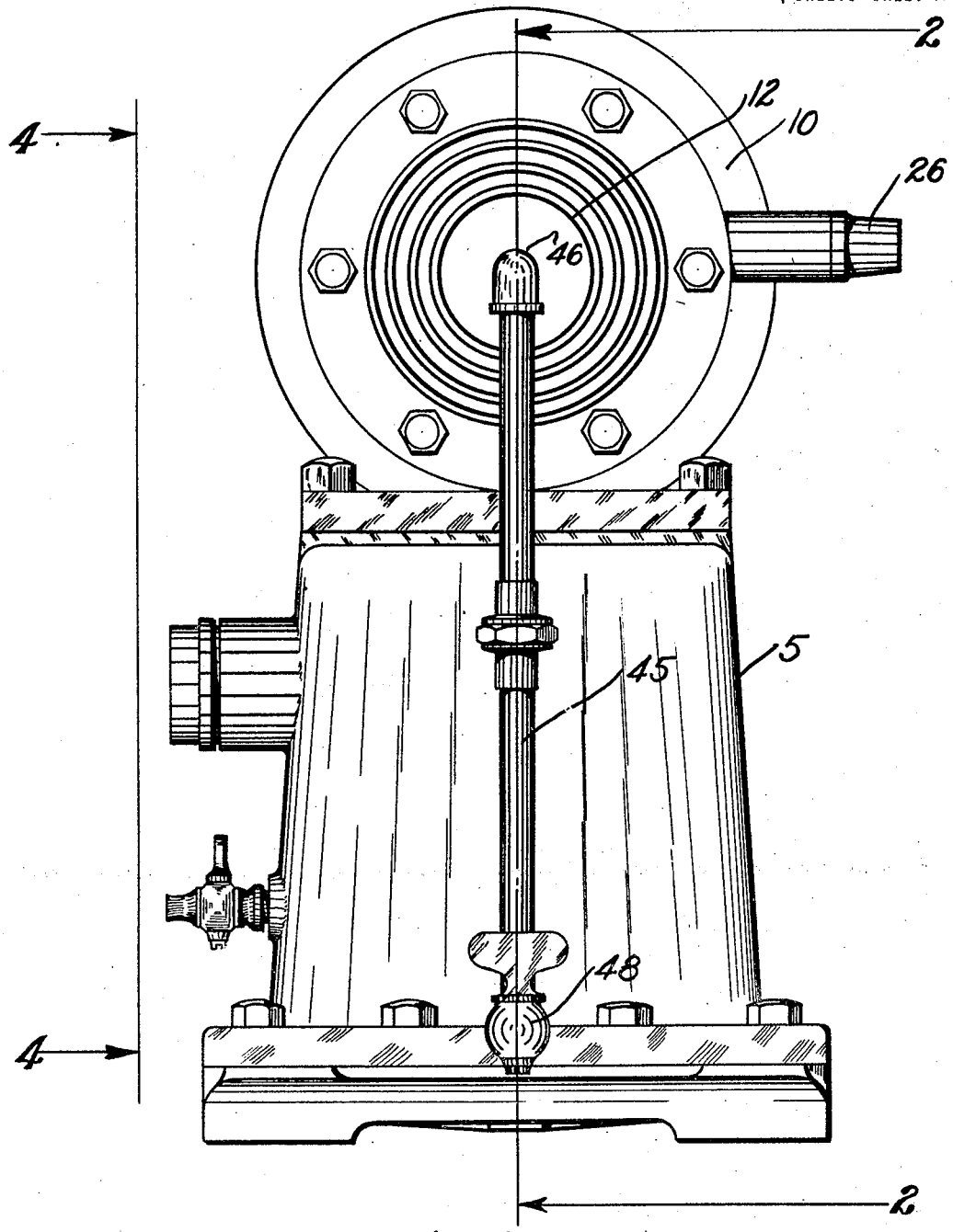
Figure 1 is an end elevation of my improved rotary compressor, being a view looking in the direction of arrow 1, Fig. 2.

Let the numeral 5 designate a base upon which is mounted a casing 6 in which is formed a chamber 7, the inner curvature of the chamber conforming to a plurality of arcs, or arcs struck from a plurality of centers. The wall of this chamber, as shown in the drawing, consists of a central member 8 and two heads 9 and 10 which abut against the ends of the part 8, each head 9 and 10 having a laterally projecting hub member 12 provided with a stuffing box 13 surrounding journals 14 and 15 with which the rotor 16 is provided, the rotor being journaled in the hubs of the heads 9 and 10 and mounted in such a manner that the chamber is sealed between the inlet 17 and the outlet 18. Hence for approximately one-quarter of the distance around the inner surface of the chamber 7, the exterior surface of the rotor is approximately in contact with the inner curved wall of the chamber, while the extremities of the rotor are approximately in contact with the inner surfaces of the end walls or heads of the chamber.

The rotor, as illustrated in the drawing, is slotted from its outer surface inwardly, as shown at 19, there being four of these slots arranged equidistantly in the rotor, or at intervals of ninety degrees. In each of these slots is located a blade 20 which is arranged to reciprocate within the slot, the latter being at least equal in depth or length to the width or depth of the blade, so that when any blade is passing the sealed part 21 of the chamber, the blade may retreat within the slot so that its outer surface shall be flush with and conform in curvature to the outer surface of the rotor.

I prefer to employ spiral springs 22 which are located in openings 23, centrally arranged between the extremities of the rotor, these springs having sufficient strength only to normally hold the blades at their limit of outward movement or in contact with the inner surface of the wall of the chamber, though it must be understood that I do not rely upon these springs to force the blades outwardly, since this is accomplished by centrifugal force and the oil pressure behind the blades or acting upon their inner edges, since the rotor is provided with a central perforation 24 which extends therethrough and through one of the journals, namely, that designated 15. A series of perforations 25 is formed in the rotor, said perforations communicating at their inner extremities with the axial perforation 24 and at their outer extremities with the bottoms of the slots in which the blades are located. Hence the oil under pressure which enters the central perforation 24 at the outer end of the journal 15, by virtue of the centrifugal force developed by the rotor when the machine is in operation, passes inwardly into the portion of said perforation which communicates with each series of openings 25 and constantly passes outwardly into engagement with the inner edge of each of the reciprocable blades 20 and acts to force said blades outwardly into engagement with the inner surface of the wall of the chamber, the centrifugal force developed by the movement of the rotor also serving to perform this function. Hence the oil pressure coöperates with the centrifugal force to cause the blades to closely engage the inner surface of the chamber in which the rotor is located.

As illustrated in the drawing, a short pipe or nipple 26 is inserted in the inlet opening 17 of the chamber 7 and communicates with a cavity 27 which extends somewhat less than ninety degrees around the chamber, the air to be compressed entering this cavity and being trapped at the extremity 28 of the cavity, remote from the inlet 17, by each blade 20, after the blade passes the said cavity. In this inlet pipe or nipple 26 is located a spring-actuated ball check valve 29 which opens in response to the suction or partial vacuum produced in the chamber 7 by the rotary movement of the blades as the rotor is actuated.

Figure 3:
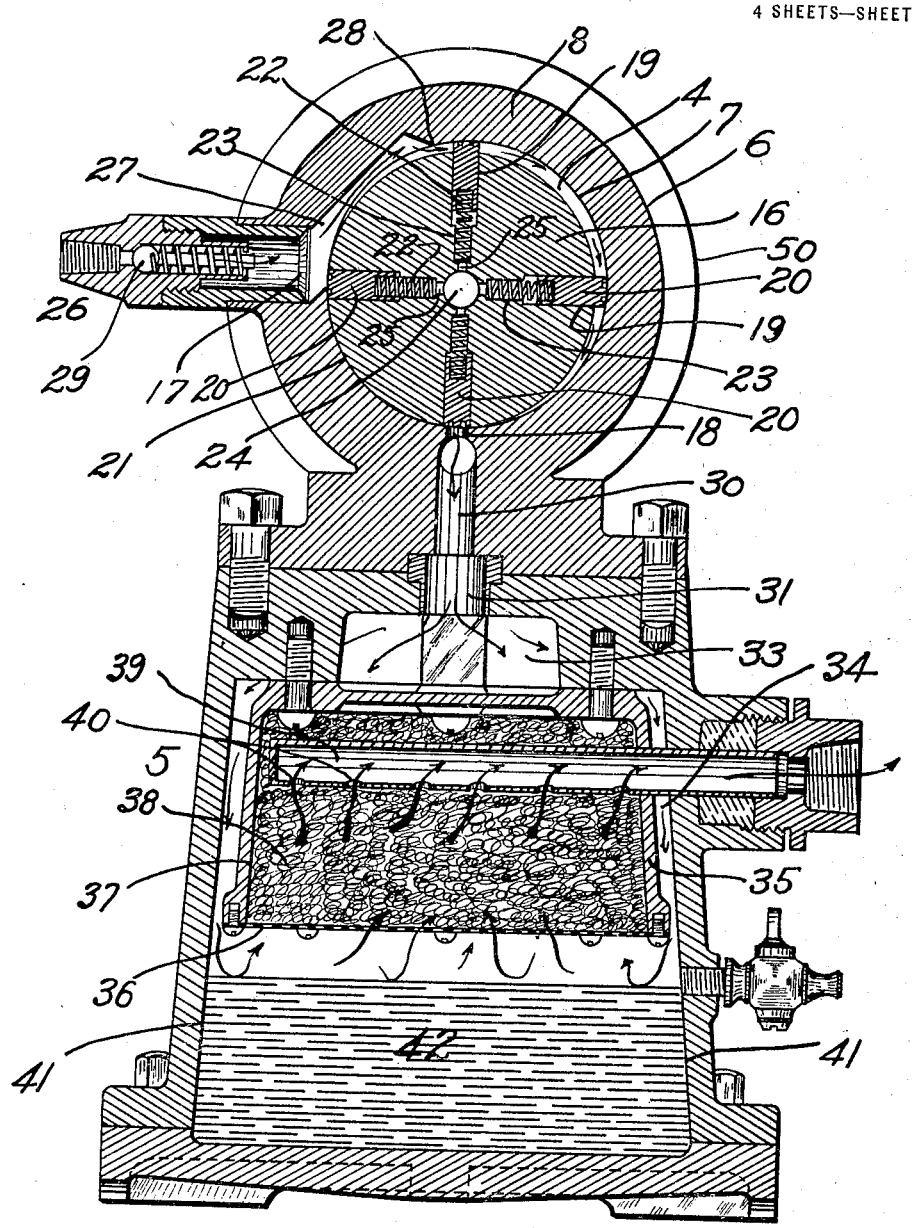
Fig. 3 is a section taken on the line 3—3, Fig. 2, looking toward the right.

After any blade passes the point 28 in the chamber 7 of the casing, it acts upon the air within the crescent-shaped portion 4 of the chamber beyond the periphery of the rotor, and this air is gradually compressed, as the portion 4 of the chamber diminishes in volume, the compressed air being finally forced out of the said chamber through the outlet 18, and thence downwardly through the passage 30 and through a port 31. From the port 31, the compressed air enters the upper part 33 of the chamber 34 which surrounds a casing member 35 which is open at the bottom and covered by a screen 36, the said casing inclosing a chamber 37 which is filled with metal shavings 38, in the upper portion of which chamber is embedded a pipe 39, perforated as shown at 40, to allow the compressed air to enter the pipe and pass thence to a receiver (not shown), as indicated by the arrow at the right of Fig. 3. The oil which enters the chamber 34 with the air is separated from the air in the chamber 37, and while the air passes into the pipe 39 and thence to the receiver, the oil settles or is precipitated in the bottom of the chamber 41, formed in the base 5, this oil being indicated by the numeral 42 in Figs. 2 and 3. From the bottom of the chamber 41, the oil, which is under the same pressure as the compressed air, is forced out of the chamber 41 through a port 43 into a pipe 44 and thence upwardly through a pipe 45 and from the upper extremity of the latter through a branch pipe 46, into the central passage 24 and thence outwardly through the perforations 25 into the slots of the rotor in which the blades are located, this oil, under pressure, acting directly upon the inner edges of the said blades. The oil also passes around the blades and enters the crescent-shaped space 4, whereby there is the same pressure on the oil in the chamber 41 as in the system, but this would not cause the oil to circulate because the pressure in the rotor chamber would be just balanced by that in the chamber 41. But as the rotor is actuated, the centrifugal force developed thereby destroys the equilibrium and causes the oil to circulate through the entire machine when the latter is in operation. In this way, the oil is continuously circulated from the center of the rotor outwardly through the slots 19, around the blades, into the space 4 and downwardly into the chamber in the base of the structure, thence from said chamber upwardly through pipe 45, where it is caused to enter the axial perforation in the journal of the rotor, as heretofore explained.

As illustrated in the drawing, the pipe 44 connects at its outer extremity with a T 47, the opposite extremity of the head of the T being provided with a valve 48 which may be opened if desired for the purpose of draining the chamber 41 or the pipe system above, as may be found necessary or desirable.

The journal 14 of the rotor is provided at its outer extremity with a pulley 50 which is keyed to the journal, as shown at 51. The necessary power for operating the rotor may be communicated thereto from any suitable motor, through the medium of this pulley.

From the foregoing description, the use and operation of my improved rotary pump, when used for air compressing purposes, is as follows: A suitable quantity of oil is placed within the structure, a main reservoir or receptacle being in the lower part of the chamber 41, formed in the base 5 of the machine. This oil, as soon as the machine is started, is acted on by the compressed air, as heretofore indicated. As the rotor is operated, each blade as it reaches the point 28 (see Fig. 3), in the inner surface of the wall of the chamber 7, begins to act on the air which is drawn into the chamber through the inlet 26, and the air which is in front of the blade is gradually compressed, as the volume of the space between the exterior surface of the rotor and the interior surface of the chamber diminishes, the compressed air being finally driven out through the outlet 18, thence downwardly through the passage 30, the port 31, into the upper portion 33 of the chamber 34, and thence downwardly into the part 41 of the chamber in the base of the structure. The air and oil pass downwardly together around the casing 35, the air, however, being separated from the oil in the chamber 37, the oil being precipitated while the air passes into the pipe 39 and thence to the receiver, the oil being acted on by such pressure and force that it is caused to pass upwardly through the pipe 45 and thence into the rotor. In this way the oil is constantly circulated through the machine.

The fact that the liquid containing chamber 41 is below the rotor chamber, is an important feature, since gravity aids the separation of the oil from the air or other gas with which my rotary pump is employed. By virtue of this construction, the oil is readily precipitated or caused to settle in the bottom of the chamber 41 and seals the bottom outlet against the escape of the compressed air or other gas. The filter arranged above or in the upper part of the chamber 41 strains the air or other gas on its way to the receiver, whereby impurities of all kinds are removed.

It must be understood that my improved machine is adapted for pumping fluids other than air, though the latter has been mainly referred to in the specification, since air compression is the use which I have more particularly in mind, though it must be understood that the machine is not limited to this specific use.

In referring to the relation between the rotor and the inner wall of its chamber between the inlet for atmospheric air and the outlet for compressed air, and also between the rotor and the end heads of the chamber, I have used the expression "approximately in contact" because if there were normally direct contact between these parts, the expansion due to rise in temperature when the machine is in operation, would create undue friction or lock the part against movement. Again, actual contact between the rotor and the chamber at the locations indicated is not necessary to form a seal, since the oil circulated through the system, as heretofore explained, coöperates with said parts to complete the seal and at the same time to lubricate the parts whereby friction and heat are reduced to a minimum.

It should be explained that the partial vacuum condition produced in the cavity 27 of the rotor chamber, due to centrifugal force of the rotor, whereby the atmospheric air is drawn into the machine, also serves to aid in the circulation of the oil through the radial slots around the blades therein.

Attention is called to the fact that each of the reciprocably mounted blades 20 of the rotor is recessed at its opposite extremities (as shown at 52) to receive packing members 53 which are acted on by springs 54 to maintain them in sealing relation with the end heads of the rotor chamber. These packing members 53 have a limited degree of movement in their recesses or cavities to compensate for varying conditions when the machine is in operation.

Having thus described my invention, what I claim is:

1. A rotary air compressor comprising a chamber having an inlet for atmospheric air and an outlet for compressed air, a rotor eccentrically mounted in said chamber and having an axial perforation and radial slots, the inner extremities of the slots being in communication with the perforation, and a liquid containing chamber arranged below the rotor chamber and in communication above the liquid therein with the compressed air outlet and in communication below the liquid therein with the rotor chamber by way of the said perforation and said slots, the slots being the only outlet for the liquid after it enters said perforation.

2. A rotary pump comprising a chamber having inlet and outlet ports, a rotor eccentrically mounted in said chamber and sealing the same between said ports, the rotor having an axial perforation and radial slots whose inner extremities communicate with said perforation, reciprocable blades mounted in said slots and whose outer extremities are adapted to engage the inner wall of the chamber, and a liquid containing chamber arranged below the rotor chamber, the liquid containing chamber being in communication above the level of the liquid therein with the said outlet port, and in communication below the level of the liquid therein with the rotor chamber through the rotor by way of said perforation and said slots, the latter constituting the only outlet for the liquid after it enters the perforation.

3. A rotary pump including an approximately cylindrical chamber having inlet and outlet ports, a rotor eccentrically mounted in said chamber and whose outer wall seals the inner wall of the chamber the entire distance approximately between said ports, leaving a crescent shaped space between the rotor and the inner wall of the chamber, the rotor having an axial perforation and radial slots, piston blades reciprocably mounted in said slots, the outer extremities of the blades being adapted to traverse the said space between the rotor and the wall of the chamber, and a liquid containing chamber arranged below the rotor chamber, the liquid containing chamber being in communication above the liquid therein with the outlet port, the liquid containing chamber being also in communication with the rotor chamber by a passage leading from the liquid containing chamber below the liquid level therein and through the rotor by way of said perforation and said slots, the latter being the only outlet for the liquid after it enters the said perforation.

4. A rotary pump comprising an approximately cylindrical chamber, a rotor mounted therein and arranged to cover the inner surface of the chamber over a substantial area between inlet and outlet ports with which the chamber is provided, to leave a crescent shaped space within the chamber, the rotor having an axial passage and radial slots whose inner extremities communicate with said passage, piston blades reciprocably mounted in the said slots and whose outer portions are adapted to enter the said crescent shaped space of the chamber, and a liquid containing chamber arranged below the rotor chamber, said liquid containing chamber being in communication above the liquid therein with the outlet port and also in communication with the rotor chamber by a passage leading from the liquid containing chamber below the level of the liquid therein through the rotor by way of said axial passage and said slots, the latter being the only outlet for the liquid after it enters said perforation.

5. A rotary pump comprising an approximately cylindrical chamber element, a cylindrical element eccentrically mounted therein and arranged to cover and seal a substantial area of the inner surface of the chamber between inlet and outlet ports with which the chamber is provided, the eccentrically mounted element having an axial perforation and radial slots communicating therewith, means for rotating one of said elements, and a liquid containing chamber arranged below said chamber element the liquid containing chamber being in communication above the liquid therein with the outlet port of said chamber element and in communication with the latter by a passage leading from the liquid containing chamber below the level of the liquid therein through the rotor by way of said perforation and said slots only.

6. A rotary pump comprising an approximately cylindrical chamber element, a cylindrical element eccentrically mounted therein and arranged to cover and seal a substantial area of the inner surface of the chamber between inlet and outlet ports with which the chamber is provided, the eccentrically mounted element having an axial passage and radial slots communicating therewith, means for rotating one of said elements, the eccentrically mounted element carrying piston blades reciprocably mounted in said slots, and a liquid containing chamber arranged below the said chamber element and which is in communication above the level of the liquid therein with the outlet port, the liquid containing chamber being also in communication with the said chamber element by a passage leading from the liquid containing chamber below the liquid level therein through the eccentrically mounted element by way of said passage therein and said slots only.

7. A rotary pump comprising an approximately cylindrical chamber element, a cylindrical element eccentrically mounted therein and arranged to cover and seal a substantial area of the inner surface of the wall of the chamber, the eccentrically mounted element having an axial passage and radial slots communicating therewith, the eccentrically mounted element having blades mounted in said slots and adapted to extend outwardly and engage the inner surface of the chamber element when the device is in use, means for rotating one of said elements, and a liquid containing chamber arranged below said chamber element and in communication above the liquid with the outlet of the said chamber element and also in communication with the chamber element by a passage leading from the liquid containing chamber below the level of the liquid therein through the eccentrically mounted element by way of the said axial passage therein and said slots only.

8. A rotary pump comprising a chamber element approximately cylindrical in cross section, a cylindrical element eccentrically mounted in said chamber to seal a substantial area of the adjacent surface of the wall of the chamber between inlet and outlet ports with which the chamber is provided, piston members reciprocably mounted in radial slots formed in said eccentrically mounted interior element which is also provided with an axial perforation, and a liquid containing chamber arranged below the chamber element and in communication above the level of the liquid therein with the outlet port of the chamber element, the liquid containing chamber being also in communication with the chamber element by a passage leading from the liquid containing chamber below the level of the liquid therein and through the axial perforation and the radial slots of the eccentrically mounted element, the said slots being the only outlet for the liquid after it enters the said perforation.

9. A rotary pump comprising a chamber element having a curved interior surface arranged between end heads, an element eccentrically mounted in said chamber element and sealing a substantial area of the inner surface of the chamber between a crescent shaped space left between the outer surface of one element and the inner surface of the other element, means for rotating one element, the chamber element having inlet and outlet ports positioned on opposite sides of the sealed area of the chamber, piston members reciprocably mounted in radial slots formed in the eccentrically mounted interior element which is also provided with an axial perforation, and a liquid containing chamber arranged below the chamber element and in communication with the outlet port of the latter above the level of the liquid therein, and a passage leading from the liquid containing chamber below the liquid level therein through the axial perforation to the inner extremities of the slots of the eccentrically mounted element, the said slots being the only outlet for the liquid after it enters the said perforation.

10. A rotary pump comprising a chamber having inlet and outlet ports suitably spaced, a rotor eccentrically mounted in the said chamber, the rotor being slotted and provided with blades reciprocably mounted in the said slots, the rotor also having an axial perforation in communication with the inner extremities of the said slots, and a liquid containing chamber arranged below the rotor chamber and being in communication above the level of the liquid, with the outlet port, the liquid containing chamber being also in communication with the rotor chamber by a passage leading from the liquid containing chamber below the level of the liquid therein through the axial perforation of the rotor and the said slots, the latter constituting the only outlet for the liquid after it enters the said perforation.

11. A rotary pump comprising a chamber element approximately cylindrical in cross section a cylindrical element eccentrically mounted in said chamber element to engage and seal the wall of the chamber between inlet and outlet ports with which the chamber is provided, and a liquid containing chamber arranged below the chamber element and in communication above the liquid therein with the outlet port, and below the liquid by a passage leading from the liquid containing chamber through the eccentrically mounted element, said passage including an axial perforation formed in the eccentrically mounted element and radial slots also formed therein and in communication at their inner extremities with said perforation, the said slots forming the only outlet for the liquid after it enters the perforation.

12. A rotary pump comprising a chamber having inlet and outlet ports, a rotor eccentrically mounted in said chamber and sealing the same between the said ports, and a liquid containing chamber arranged below the rotor chamber and in communication therewith above the liquid by way of the said outlet port and below the liquid by a passage which extends through the rotor, said passage including an axial perforation formed in the rotor and radial slots also formed therein and in communication at their inner extremities with said perforation, the said slots forming the only outlet for the liquid after it enters said perforation.

13. A rotary pump comprising a chamber having inlet and outlet ports, a rotor eccentrically mounted in said chamber, and a liquid containing chamber arranged adjacent the rotor chamber and in communication therewith above the liquid by way of the said outlet port and below the liquid by way of the passage extending through the rotor, said passage including an axial perforation formed in the rotor and radial slots also formed therein and in communication at their inner extremities with the said perforation, the said slots forming the only outlet for the liquid after it enters said perforation.

14. A rotary pump comprising an approximately cylindrical chamber element, a cylindrical element eccentrically mounted therein and arranged to seal the chamber between inlet and outlet ports with which the chamber element is provided, means for rotating one of said elements and a liquid containing chamber adjacent said chamber element and in communication therewith above the liquid by way of the outlet port and below the liquid by a passage extending through the eccentrically mounted element, and including an axial perforation formed in said last named element and radial slots also formed therein and in communication with the said perforation at their inner extremities, the said slots forming the only outlet for the liquid after it enters said perforation.

15. A rotary pump comprising a chamber element, a second element eccentrically mounted therein and arranged to seal the chamber element between inlet and outlet ports with which the last named element is provided, means for rotating one of said elements, and a liquid containing chamber arranged adjacent said chamber element and in communication with the latter by passages leading from the liquid containing chamber above and below the liquid respectively, the passage above the said outlet being in communication with the said outlet port and that below the liquid extending through the said eccentrically mounted element and including an axial perforation formed in said last named element and radial slots also formed therein and in communication with the said passage at their inner extremities, said slots forming the only outlet for the liquid after it enters the said perforation.

16. A rotary pump comprising a cylindrical chamber element, a cylindrical element eccentrically mounted therein and arranged to engage the chamber element between inlet and outlet ports with which the chamber element is provided, means for rotating one of said elements, the eccentrically mounted element carrying piston blades reciprocably mounted in slots formed in said element, and a liquid containing chamber arranged adjacent said chamber element and in communication therewith by passages leading respectively from the liquid containing chamber above and below the liquid, the passage above the liquid leading to the said outlet port and that below the liquid extending through the said slots in the eccentrically mounted element, the latter having an axial perforation with which the inner extremities of said slots are in communication, the slots forming the only outlet for the liquid after it enters said perforation.

17. A rotary pump comprising an approximately cylindrical chamber element, a cylindrical element eccentrically mounted in said chamber element and engaging the same between inlet and outlet ports with which the chamber element is provided, means for rotating one of said elements, piston blades reciprocably mounted in radial slots formed in the eccentrically mounted element, the rotor also having an axial perforation in communication with the inner extremities of the said slots, and a liquid containing chamber arranged adjacent said chamber element and in communication therewith by passages leading from the liquid containing chamber above and below the liquid, the passage above the liquid leading to the said outlet port and that below the liquid extending through said axial perforation and the said slots of the eccentrically mounted element, the said slots forming the only outlet for the liquid after it enters said perforation.

18. In a rotary air compressor, the combination of a chamber, a rotor eccentrically mounted therein and having an axial passage and radial slots in communication therewith at their inner extremities, blades slidable in said slots and whose outer extremities engage the inner surface of the chamber, a liquid-containing receptacle below the chamber and in communication, below the level of the liquid with the said passage of the rotor and said slots, the slots being the only outlet for the liquid after it enters said passage, an air and liquid separator arranged above the said receptacle and in communication with the rotor chamber on the outlet side and with the said receptacle for the return of the liquid, and whereby the liquid in the receptacle is under the service pressure of the air when the machine is in operation for air-compression purposes.

In testimony whereof I affix my signature.

HENRY O. JACKSON.